March 10, 1959  F. KUHRT  2,877,394
HALL EFFECT DEVICE
Filed July 1, 1955
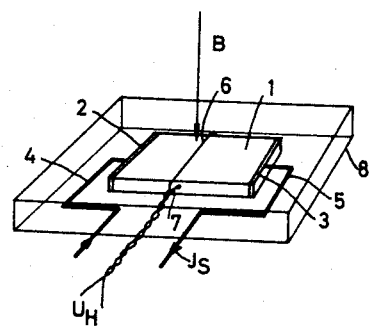

United States Patent Office 2,877,394
Patented Mar. 10, 1959

2,877,394
HALL EFFECT DEVICE

Friedrich Kuhrt, Nurnberg, Germany, assignor to Siemens-Schuckertwerke Aktiengesellschaft, Berlin-Siemensstadt and Erlangen, Germany, a corporation of Germany Application July 1, 1955, Serial No. 519,319

Claims priority, application Germany July 1, 1954

15 Claims. (Cl. 317—234)

The invention relates to devices comprising electric resistance bodies which are subjected to a magnetic field and which have, in addition to a pair of current electrodes, a pair of auxiliary electrodes installed transversely to the direction of current. If a current I flows through the resistance body and if a magnetic field induces in the resistance body a magnetic component of induction B vertical to the plane of its current path there is produced at the auxiliary electrodes the so-called Hall voltage, which is proportional to the product J. B. To distinguish the auxiliary electrodes from the current electrodes the auxiliary electrodes are hereafter termed Hall electrodes. The underlying effect, known for a long time is the so-called Hall effect. The so-called Hall constant which determines the magnitude of the Hall voltage is indicated as the measure of the Hall effect. The Hall effect is extremely large with bismuth and with the semiconductor germanium. In these cases it was the object of special investigations during the past years. By suitable choice of the activator dosage Hall constants could be obtained with germanium which are approximately $10^5$ times as large as with bismuth. Proposals have also become known to employ the Hall voltage for technical purposes, more particularly for measuring purposes. However, general technical application or use failed up to the present owing to the fact that the utilization of the Hall voltage with germanium was only possible when loading of the Hall voltage circuit was avoided.

In the investigation of the Hall effect of germanium it was found that if a magnetic field H variable in time exists a detrimental component proportional to $dH/dt$ may occur in the Hall circuit. An arrangement is also known by which a detrimental component may be avoided. Used for this purpose is a special conductor which is provided between one pole of an associated magnetic field arrangement and the resistance body, and which is connected with one Hall electrode of the resistance body. This special conductor is in the form of a flat strip which is pivotally mounted at one of its ends. By accurately adjusting the angle of rotation the detrimental component may be eliminated.

The invention is based on the discovery that the expenditure involved in the known arrangement is not necessary and that a Hall circuit free from an inductive component may be produced by substantially simpler means.

According to the invention the Hall electrodes are placed in the center of the resistance body and one of the feed conductors leading to one of the take off points of the Hall voltage is led out in the direction of the other take off point of the Hall voltage. It preferably lies directly on the upper face of the resistance body and is insulated therefrom. Thereafter it is extended together with the feed conductor leading to the other take off point of the Hall voltage in such manner that an effective induction surface in relation to the magnetic field flux of the device is avoided. These measures are based on the fact that, when a homogeneous magnetic field is provided, the detrimental component, which is proportional to the time varying magnetic field, is due to two unequal current surfaces in the resistance body which are formed on the left and on the right hand of an imaginary line connecting the Hall electrodes. These current surfaces are saturated with the magnetic field variable in time. If the Hall electrodes are arranged according to the present invention the difference between the two induction surfaces is necessarily made equal to zero because unequal current surfaces are avoided from the outset, so that an induction voltage can not occur at all. The invention is of special importance in the case of the resistance bodies recently developed which consist of semiconducting compounds having a high carrier mobility of at least about 6000 cm.$^2$/v. sec. Of particular importance are compounds of one of the elements aluminum, gallium or indium of the IIIrd group, subgroup b, with one of the elements phosphorus, arsenic or antimony of the Vth group, subgroup b, of the periodic system of the elements. Semiconducting compounds of this type are described in the U. S. patent applications Ser. No. 275,785, now Patent No. 2,798,989 and No. 391,647. They are characterized by a relatively high Hall constant. However, their special advantage, as compared with the resistance bodies hitherto employed for the utilization of the Hall effect, resides in that the compounds of the above mentioned materials render possible the production of Hall circuits which can be so highly loaded that measuring instruments absorbing power, as well as other power consuming units such as relays, magnetic amplifiers, and so on, may be operated directly. These "Hall generators" thus constitute a new constructional element for measuring, controlling and regulating techniques, which in many cases permits the solution of electrical design problems in a simpler and more advantageous way than has been the case hitherto. Practical circumstances, however, require the Hall generators to be as simple and inexpensive as possible and to operate without any trouble, lest complicated measures required and considerable expenses entailed thereby should eliminate technical applications from the outset. The simple measures described herein are well suited to provide Hall generators of a high quality which satisfy the said requirements economically.

According to a further development of the invention, it is especially advantageous to design the current electrodes in such a way that they are in areal, that is, surface, or linear contact with the resistance body. Unlike current electrodes in point contact with a resistance body, the design just mentioned makes possible a uniform distribution of the flow planes in the resistance body even in cases where a small inductive residual component remains. This can arise from defects in manufacture, in the central arrangement, and in the leading out and the installing of the lead-in wires forming the Hall electrodes. In such cases the above mentioned linear or areal design of the current electrodes can be advantageous for a compensation of a disturbing induction. This design has also proven advantageous in speedy mass production of high-quality Hall effect devices because the invention makes it possible to fix the wires leading to the Hall-voltage taps in the manner described above, e. g. by means of an adhesive, or by embedding the wires in a hardening casting resin and thereby permits a compensation which, practical purposes, cannot be disturbed any more by external influences. This is achieved by coating the end parts of the resistance body to which the current electrodes are connected with a conductive metal layer. The dimensions of the areas affecting the induction can easily be varied and adjusted to each other by removing, later on, part of the coating of one current electrode. The electrodes in their final form are then advantageously coated with an insulating protective layer. Of course it would also be possible to achieve compensation of disturbing inductions by subsequently enlarging the area of one current electrode.

For a more detailed explanation of the invention I refer to the drawing representing schematically an embodiment of the invention. The figure shows a resistance body 1 consisting for example of a rectangular lamella. The resistance body should be imagined as arranged in the air gap of a magnetic-field arrangement indicated by an arrow B, but not represented in detail. The resistance body is in areal contact, that is, contact over an extended area, with two current electrodes 2 and 3 each of which is connected to a lead-in wire 4 and 5, respectively, passing the sides of the resistance body 1. The electrodes are traversed by the current $J_S$ which is supplied by any type of current source, not represented. The wires leading to the tapping points of the Hall voltage $U_H$, which form at the same time the Hall electrodes, are marked 6 and 7, respectively. They are in point contact with the resistance body and are mounted at the respective centers of the front face and back face of the resistance body 1, being soldered to the same. They lead to a measuring, control or regulating device or the like, not represented. The insulated wire 6 connected to the rear Hall electrode is immediately led out of the air gap of the magnetic-field arrangement, not represented, towards the connecting point of the wire 7 which is connected to the front Hall electrode and is then led away, twisted together with the wire 7. Instead of being twisted, the two lead-in wires may also be superposed, to avoid inductive effects caused by the flux, or leakage flux, of the magnetic-field arrangement. It is preferable to lead the wire 6 toward the other Hall voltage tap by the shortest distance possible, i. e. by placing it on the resistance body 1. This makes possible an especially desirable flat design, so that the air gap can be small and the wire can be firmly fixed. The wires need not be specially insulated from the resistance body when they are varnished. In special cases, however, particularly when the resistance body is arranged in the air gap in such a manner that it is mobile or removable, an intermediate insulating layer, e. g. in the form of a thin insulating foil can be employed. The embedding of the device in an insulating material 8, particularly in casting resin, that is, of at least the middle part of the resistance body and the connecting lines belonging to the Hall voltage taps, imparts mechanical stability to the connecting lines and protects the resistance body from mechanical strains to which it is in general responsive.

The measures described above for arranging the Hall electrodes in a way to prevent occurrence of an inductive component in the Hall circuit can also be applied to the current electrodes, i. e. with regard to the control circuit of the resistance body. This is, however, necessary only when control currents are present in the circuit connected to the current electrodes, which currents cannot be sufficiently distinguished from the induced foreign components.

What I claim is:

1. A Hall effect device comprising a resistance body, said resistance body having two opposed large area faces, two opposed side edge faces, and two opposed longitudinal edge faces, current supply electrodes on and coextensive with at least a major part of the length of the side edge faces, and a pair of Hall electrodes for taking off the Hall voltage, each of said Hall electrodes being disposed in a longitudinal edge face of said resistance body half-way between the side edge faces, conductor leads connected to said Hall electrodes, one of said leads being insulated and having a straight part traversing in a straight line directly over and closely adjacent to one only of the large area faces of the said resistance body in the direction of the connecting point of the conductor to the other Hall electrode of the same body, the other large area face being free of Hall conductor leads, said one lead being thereby directly led to the other, the two being thereafter led away from said large area face twisted together about each other, to minimize any effective induction area with respect to any alternating magnetic flux to which the resistance body may be subjected.

2. The Hall effect device defined in claim 1, in which said resistance body comprises a semiconductor compound having a minimum carrier mobility of about 6000 cm.²/v. sec., to form a "Hall generator."

3. A Hall effect device comprising a resistance body, said resistance body having two opposed large area faces, two opposed side edge faces, and two opposed longitudinal edge faces, current supply electrodes on and coextensive with at least a major part of the length of the side edge faces, and a pair of Hall electrodes for taking off the Hall voltage, each of said Hall electrodes being disposed in a longitudinal edge face of said resistance body half-way between the side edge faces, conductor leads connected to said Hall electrodes, one of said leads being insulated and having a straight part traversing in a straight line directly over and closely adjacent to one only of the large area faces of the said resistance body in the direction of the connecting point of the conductor to the other Hall electrode of the same body, the other large area face being free of Hall conductor leads, said one lead being thereby directly led to the other, the two being thereafter led away from said large area face together, to minimize any effective induction area with respect to any alternating magnetic flux to which the resistance body may be subjected, the body being formed of a semiconducting compound of an element taken from the group consisting of phosphorus, arsenic, and antimony, and an element taken from the group consisting of aluminum, gallium, and indium.

4. The device defined in claim 1 in which at least the center part of said resistance body which is provided with the conductors forming the Hall electrodes is embedded in an insulating mass comprising an electrically insulating casting resin material.

5. A Hall effect device comprising a semiconductor plate having a minimum carrier mobility of about 6000 cm.²/volt second, said plate having two opposed large area faces, two opposed side edge faces, and two opposed longitudinal edge faces, current supply electrodes on and substantially coextensive with the side edge faces, and a pair of Hall point electrodes for taking off the Hall voltage, each of said Hall point electrodes being disposed in the center of a longitudinal edge face of said plate, conductor leads connected to said Hall electrodes, one of said leads being insulated and having a straight part traversing in a straight line directly over and closely adjacent to a large area face of the said plate in the direction of the connecting point of the conductor to the other Hall electrode of the same plate, the other large area face being free of Hall conductor leads, the two leads thereafter being led away at least closely adjacent each other, to minimize any effective induction area with respect to any alternating magnetic flux to which the plate may be subjected.

6. A Hall effect device comprising a semiconductor plate having a minimum carrier mobility of about 6000 cm.²/volt second, said plate having two opposed large area faces, two opposed side edge faces, and two opposed longitudinal edge faces, current supply electrodes on and substantially coextensive with the side edge faces, and a pair of Hall point electrodes for taking off the Hall voltage, each of said Hall point electrodes being disposed in the center of a longitudinal edge face of said plate, conductor leads connected to said Hall electrodes, one of said leads being insulated and having a straight part traversing in a straight line directly over and closely adjacent to a large area face of the said plate in the direction of the connecting point of the conductor to the other Hall electrode of the same plate, the other large area face being free of Hall conductor leads, the two leads thereafter being led away at least closely adjacent each other, to minimize any effective induction area with respect to any alternating magnetic flux to which the plate may be subjected, the current supply electrodes comprising a coating of mutually parallel metallic strips the dimensions of which are variable by augmentation or diminution to obtain said minimizing of effective induction area.

7. The device of claim 5 in which the two led away conductor leads are entwined about each other.

8. The device of claim 5 in which the two led away conductor leads are twisted about each other, the device being embedded in an insulating protective material which fixes the above described position of the said leads, the plate and the protective embedding having flat large area faces.

9. The device of claim 5 embedded in an insulating protective hardened plastic which fixes the above described position of the said leads.

10. The device of claim 6 in which at least the center part of said plate which is provided with the said conductors connected to the Hall electrodes is embedded in an electrically insulating casting resin.

11. A Hall effect device comprising a resistance body, said resistance body having two opposed large area faces, two opposed side edge faces, and two opposed longitudinal edge faces, current supply electrodes on and co-extensive with at least a major part of the length of the side edge faces, and a pair of Hall electrodes for taking off the Hall voltage, each of said Hall electrodes being disposed in a longitudinal edge face of said resistance body half-way between the side edge faces, conductor leads connected to said Hall electrodes, one of said leads being insulated and having a straight part traversing in a straight line directly over and closely adjacent to one only of the large area faces of the said resistance body in the direction of the connecting point of the conductor to the other Hall electrode of the same body, the other large area face being free of Hall conductor leads, said one lead being thereby directly led to the other, the two being thereafter led away from said large area face together, to minimize any effective induction area with respect to any alternating magnetic flux to which the resistance body may be subjected, at least the center part of said resistance body which is provided with the conductors forming the Hall electrodes being embedded in an insulating mass comprising an electrically insulating casting resin material.

12. A Hall effect device comprising a resistance body, said resistance body comprising a semiconductor plate of indium antimonide and having two opposed large area faces, two opposed side edge faces, and two opposed longitudinal edge faces, current supply electrodes on and co-extensive with at least a major part of the length of the side edge faces, and a pair of Hall electrodes for taking off the Hall voltage, each of said Hall electrodes being disposed in a longitudinal edge face of said resistance body half-way between the side edge faces, conductor leads connected to said Hall electrodes, one of said leads being insulated and having a straight part traversing in a straight line directly over and closely adjacent to one only of the large area faces of the said resistance body in the direction of the connecting point of the conductor to the other Hall electrode of the same body, the other large area face being free of Hall conductor leads, said one lead being thereby directly led to the other, the two being thereafter led away from said large area face together, to minimize any effective induction area with respect to any alternating magnetic flux to which the resistance body may be subjected.

13. A Hall effect device comprising a resistance body, said resistance body comprising a semiconductor plate formed of indium arsenide and having two opposed large area faces, two opposed side edge faces, and two opposed longitudinal edge faces, current supply electrodes on and co-extensive with at least a major part of the length of the side edge faces, and a pair of Hall electrodes for taking off the Hall voltage, each of said Hall electrodes being disposed in a longitudinal edge face of said resistance body half-way between the side edge faces, conductor leads connected to said Hall electrodes, one of said leads being insulated and having a straight part traversing in a straight line directly over and closely adjacent to one only of the large area faces of the said resistance body in the direction of the connecting point of the conductor to the other Hall electrode of the same body, the other large area face being free of Hall conductor leads, said one lead being thereby directly led to the other, the two being thereafter led away from said large area face together, to minimize any effective induction area with respect to any alternating magnetic flux to which the resistance body may be subjected.

14. A Hall effect device comprising a semiconductor body, said body having two opposed large area faces, two opposed side edge faces, and two opposed longitudinal edge faces, current supply electrodes on and co-extensive with at least a major part of the length of the side edge faces, and a pair of Hall electrodes for taking off the Hall voltage, each of said Hall electrodes being disposed along a longitudinal edge portion of said body, conductor leads connected to said Hall electrodes, one of said leads being insulated and having a straight part traversing in a straight line directly over and closely adjacent to one only of the large area faces of the said body in the direction of the connecting point of the conductor to the other Hall electrode of the same body, the other large area face being free of Hall conductor leads, said one lead being thereby directly led to the other, the two being thereafter led away from said large area face at least closely together, to minimize any effective induction area with respect to any alternating magnetic flux to which the body may be subjected, the body being formed of a semiconducting compound of an element taken from the group consisting of phosphorus, arsenic, and antimony, and an element taken from the group consisting of aluminum, gallium, and indium.

15. A Hall effect generator device comprising a semiconductor compound body, said body having a minimum carrier mobility of about 6000 $cm.^2/v.$ sec. and two opposed large area faces, two opposed side edge faces, and two opposed longitudinal edge faces, current supply electrodes on and co-extensive with at least a major part of the length of the side edge faces, and a pair of Hall electrodes for taking off the Hall voltage, each of said Hall electrodes being disposed along a longitudinal edge portion of said body, conductor leads connected to said Hall electrodes, one of said leads being insulated from and having a straight part traversing in a straight line directly over and closely adjacent to one only of the large area faces of the said body in the direction of the connecting point of the conductor to the other Hall electrode of the same body, the other large area face being free of Hall conductor leads, said one lead being thereby directly led to the other, the two being thereafter led away from said large area face at least closely together, to minimize any effective induction area with respect to any alternating magnetic flux to which the body may be subjected, said device having the characteristic that it is capable of employment with a Hall voltage circuit that carries substantial load.

References Cited in the file of this patent

UNITED STATES PATENTS

| | | |
|---|---|---|
| 1,822,129 | Craig | Sept. 8, 1931 |
| 1,825,855 | Craig | Oct. 6, 1931 |
| 1,998,952 | Edgar et al. | Apr. 23, 1935 |
| 2,594,939 | Leete | Apr. 29, 1952 |

OTHER REFERENCES

Electronics, March 1954, pages 238, 240, and 242.